United States Patent Office 2,880,104
Patented Mar. 31, 1959

2,880,104

WATER REDUCIBLE TEXTURE PAINT

Edward C. Scholl, Hasbrouck Heights, N.J., assignor to United Gilsonite Laboratories, Scranton, Pa., a corporation of Pennsylvania No Drawing. Application September 26, 1955
Serial No. 536,731

1 Claim. (Cl. 106—128)

This invention is a water reducible texture paint adapted to be marketed in a powdered form and of such quality that it will keep in storage indefinitely.

Water reducible texture paints have long been known. They have been sold in both liquid and powdered form. The principal binder in most of these paints has been an alkali soluble protein, such as casein, which, in order to be effective, must be solubilized with various alkalis. Calcium hydroxide is among those alkalis that have been generally used for this purpose.

All of these prior texture paints have been open to the general objection that, when ready for use, either in the initial liquid form or by adding water to the powdered form they rapidly deteriorate through loss of viscosity which materially affects the covering power and stippling properties. Furthermore, when calcium hydroxide is used as the solubilizing agent in water reducible powdered texture paints the calcium reacts with the protein to form the insoluble calcium proteinate which renders the paint useless within a perid of 24 hours. Therefore, after the water is added to the powdered paint the deterioration occurs so rapidly that any paint which is left over after immediate use must be discarded as useless.

These paints have a further disadvantage in that the use of an alkali to dissolve the protein causes a reaction to occur between the protein and the alkali and the product of such reaction remains in the film causing it to remain alkaline even after drying, so that subsequent painting of the stipple surface with a paint sensitive to alkali is impractical.

Another disadvantage in the use of powdered protein bound texture paints is inherent in the fact that, after adding water preparatory to use, a waiting period is required in order that the alkali solubilizing agents can dissolve the protein and render the product usable.

Other water reducible powdered texture paints have heretofore been employed utilizing animal or vegetable glues as the binder. The covering power of such paints is materially inferior to the protein bound paints.

These paints have the disadvantage of being reactivated by water. Consequently, in order to redecorate surfaces over which these paints have been applied with another water reducible paint, it is necessary to completely remove them from the surface to be painted.

Starch has been used as a binder for water reducible powdered texture paints. Starches used for this purpose have been derived from corn, potatoes, and tapioca. These paints are open to the objection that upon drying, the painted surface, instead of being a solid uniform color, will show many variations in shade producing a mottled appearance. The adhesion of these paints is inferior to that of the protein bound and glue bound paints. Moreover they tend to sag while setting and as a result these paints do not retain their stipple.

Paints embodying combined binders of protein, glue and starch have also been proposed, but experience has shown that they generally are open to all of the objections hereinbefore referred to.

Attempts have been made to overcome these disadvantages by the employment of other modifiers and while these modifiers have materially assisted in the amelioration of these disadvantages, there is the ever present tendency for them to appear in practice.

With the foregoing considerations in mind, the object of the present invention is to provide a water reducible texture paint entirely free from the disadvantages referred to through the elimination therein of binders of the character described, so that any tendency for these difficulties to appear is entirely eliminated.

A further object of the invention is to provide an absolutely stable water reducible powdered texture paint which will not only keep in storage indefinitely without spoilage, but which, after mixing, will also keep indefinitely and is adapted for successive uses over long periods of time to obtain maximum effectiveness in covering power, lack of sagging, fine texture and good adhesion in the finished job.

Furthermore, the paint may be mixed by simply adding water thereto, stirring the mixture, after which it may be used immediately as no waiting time is required.

A further feature of the invention is inherent in the fact that my paint has excellent application and texturing qualities, covers well and adheres to practically all surfaces.

A further feature of the invention is that this paint is essentially neutral, therefore it can be redecorated with all types of paints. Thus, it is not limited to redecoration with paints insensitive to alkali.

The present invention embodies essentially the utilization of a particular protein and a water soluble cellulose ether, combined physically with certain embodying agents, a filler, an appropriate pigment, a solubilizer and an appropriate fungicide.

The formulations of this invention may vary. As bodying agents I have found that I must employ a magnesium silicate (talc) and potassium aluminum silicate (mica), but the percentages of these constituents with respect to the remainder of the batch may vary within reasonable limits. The preferred filler is calcium carbonate and hydrated aluminum silicate (kaolinite), but other fillers may be used, such as finely ground silica, diatomaceous earth, or calcium silicate. As a pigment, titanium calcium pigment is preferable, but titanium dioxide, lithopone, or zinc sulphide may be employed. The solubilizing agent is preferably borax, but other solubilizing agents well known in the art, as such, may be employed.

Illustrative examples of the product of this invention follow:

*Example 1*

| | Pounds |
|---|---|
| Magnesium silicate | 68–77 |
| Hydrated aluminum silicate | 66–74 |
| Potassium aluminum silicate (mica) | 53–60 |
| Calcium carbonate | 30–38 |
| Titanium calcium pigment | 15–20 |
| Water soluble cellulose ether (55% active cellulose) | 5–10 |
| Sodium pentachlorophenate | 1– 3 |
| Borax | 1– 3 |
| Protein | 30–40 |

Example 2

| | |
|---|---|
| Magnesium silicate | 68–77 |
| Diatomaceous earth | 30–45 |
| Potassium aluminum silicate (mica) | 53–60 |
| Finely ground silica | 66–70 |
| Titanium calcium pigment | 15–20 |
| Water soluble cellulose ether (55% active cellulose) | 5–10 |
| Sodium pentachlorophenate | 1– 3 |
| Borax | 1– 3 |
| Protein | 30–40 |

Example 3

| | |
|---|---|
| Magnesium silicate | 68–77 |
| Calcium silicate | 30–38 |
| Potassium aluminum silicate (mica) | 53–60 |
| Hydrate aluminum silicate | 66–74 |
| Lithopone | 18–30 |
| Water soluble cellulose ether (55% active cellulose) | 5–10 |
| Sodium pentachlorophenate | 1– 3 |
| Borax | 1– 3 |
| Protein | 30–40 |

The protein which I prefer to employ in the formulations of this invention is soybean meal which is a relatively cheap by-product or residue of the conventional process of extracting soybean oil from the bean. It is not a purified protein product, but experience has shown that it is even more effective than a pure protein. While different commercial soybean meals may be employed, I have used with complete satisfaction a product produced by dehulling and grinding the soybean to approximately 200 mesh after the oil has been extracted. The resulting soybean meal has a moisture content of approximately 7%, minimum protein of approximately 50%, maximum oil approximately 1%, maximum ground fibre (carbohydrate and cellulose) approximately 2½%, with water dispersible protein 70 to 79% on the basis of the 50% minimum protein.

The water soluble cellulose ether employed is selected from the group which consists of sodium carboxy methyl cellulose, the methyl ether of cellulose and hydroxy ethyl cellulose. The cellulose ether used may vary in active cellulose content within reasonabe limits, but it will be understood that the minimum limit should never be so low as to introduce into the formulation an undesirable quantity of the solubilizing agent in combination with which these cellulose ethers are commonly supplied. Various chemical companies supply as well known commercial products, cellulose ethers combined with solubilizing agents therefor. One such product, used in the present inventions, contains 55% by weight methyl cellulose solubilized by 36% by weight sodium chloride, 8% by weight of glycolate, and 1% by weight of sodium carbonate and sodium bicarbonate. In the foregoing examples, 5–10 lbs. of 55% active cellulose have been specified for the purpose of concrete example, but it will be understood that the employment of a commercial cellulose ether of a different active cellulose content will require a different poundage of this material in the formulation in order to provide substantially the same amount of the active cellulosic material in the formulations of the examples.

The foregoing two essential constituents of the paint, namely, the protein and the water soluble cellulose ether, when incorporated into the illustrative formulations heretofore given and others of similar constituents, produces a water reducible powdered texture paint of outstanding performance. These essential constituents interact with each other to function as a binder embodying all of the desirable attributes of protein, glue and starch without the detrimental features of any of them. The other constituents not only individually serve one particular purpose, but cooperate in the mix and in the film in the following manner: For example, the bodying agents produce and maintain the desired stipple effect in the finished coating. The fillers add covering power since they are high dry hiding type fillers, and assist the pigment in this connection. The fillers also materially effect the brushing qualities of the paint. The pigment and solubilizing agent perform their usual functions. The sodium pentachlorophenate functions as a preservative for the protein and the sodium carboxy methyl cellulose and further prevents the deterioration of the paint by mildew.

The constituents of this product are mixed together at room temperature in a dry condition to insure a uniform blending of all ingredients. They are prepared for use by adding thereto cold water. There is no heating required at any time in the procedure.

I am aware that soybean meal has heretofore been used in water reducible paints and particularly in casein and purified protein bound paints, as an extender for the casein and/or protein. However, so far as I am aware, I am the first to use the combination of soybean meal and a water soluble cellulose ether as the sole binder in any paint, particularly in a water reducible powdered texture paint. The combination of these two constituents interacting with one another in the manner described produces a superior product and one which fills a long felt want in the art to which it pertains.

The foregoing detailed description sets forth the invention in its preferred practical forms, but the invention is to be understood as fully commensurate with the appended claim.

Having thus fully described the invention what I claim as new and desire to secure by Letters Patent is:

A water reducible powdered texture paint composition which consists of:

| | Parts |
|---|---|
| Magnesium silicate, approximately | 68–77 |
| Hydrated aluminum silicate, approximately | 66–74 |
| Potassium aluminum silicate, approximately | 53–60 |
| Calcium carbonate, approximately | 30–38 |
| Titanium calcium pigment, approximately | 15–20 |
| Water soluble cellulose ether compound (consisting essentially of approximately 55% by weight high viscosity methylcellulose ether, approximately 36% by weight sodium chloride, approximately 8% by weight glycolate, and approximately 1% by weight of sodium carbonate and sodium bicarbonate), approximately | 5–10 |
| Sodium pentachlorophenate, approximately | 1– 3 |
| Borax, approximately | 1– 3 |
| Soybean meal, approximately | 30–40 |

References Cited in the file of this patent

UNITED STATES PATENTS

| | | |
|---|---|---|
| 1,811,972 | Schmidt | June 30, 1931 |
| 1,829,258 | Bradshaw et al. | Oct. 27, 1931 |
| 2,047,919 | Magill | July 14, 1936 |
| 2,280,546 | Schuler | Apr. 21, 1942 |
| 2,340,072 | Medl | Jan. 25, 1944 |
| 2,385,240 | Ware | Sept. 18, 1945 |
| 2,441,927 | Adams | May 18, 1948 |
| 2,720,464 | Anderson et al. | Oct. 11, 1955 |